(12) United States Patent
Lee et al.

(10) Patent No.: US 11,061,260 B2
(45) Date of Patent: Jul. 13, 2021

(54) CONTROL OF DUAL PHASE TUNERS

(71) Applicant: International Business Machines Corporation, Armonk, NY (US)

(72) Inventors: Benjamin Giles Lee, Ridgefield, CT (US); Nicolas Dupuis, New York, NY (US); Jonathan E. Proesel, Mount Vernon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 16/238,191

(22) Filed: Jan. 2, 2019

(65) Prior Publication Data
US 2020/0209654 A1  Jul. 2, 2020

(51) Int. Cl.
  *G02F 1/01* (2006.01)
  *G02F 1/225* (2006.01)
  *G02F 1/21* (2006.01)

(52) U.S. Cl.
  CPC .......... *G02F 1/0147* (2013.01); *G02F 1/0121* (2013.01); *G02F 1/225* (2013.01); *G02F 1/212* (2021.01); *G02F 1/215* (2021.01); *G02F 2203/50* (2013.01)

(58) Field of Classification Search
  CPC ...... G02F 1/0121; G02F 1/0147; G02F 1/225; G02F 2001/212; G02F 2001/215; G02F 2203/50
  See application file for complete search history.

(56) References Cited

U.S. PATENT DOCUMENTS

| 5,999,293 | A | 12/1999 | Manning | |
|---|---|---|---|---|
| 6,421,155 | B1 * | 7/2002 | Yano | H04B 10/25137 398/183 |
| 8,948,608 | B1 * | 2/2015 | Pobanz | G02F 1/2255 398/183 |
| 9,128,308 | B1 * | 9/2015 | Zortman | G02F 1/025 |
| 10,823,989 | B2 * | 11/2020 | Kawakami | G02F 1/0327 |
| 2009/0046857 | A1 | 2/2009 | Nambu et al. | |
| 2009/0245813 | A1 * | 10/2009 | Bonthron | G02F 1/225 398/188 |
| 2014/0241657 | A1 * | 8/2014 | Manouvrier | H04B 10/5053 385/3 |
| 2014/0248019 | A1 * | 9/2014 | Witzens | G02F 1/0121 385/2 |

(Continued)

FOREIGN PATENT DOCUMENTS

CN  105897339 A  8/2016

OTHER PUBLICATIONS

Chen, "CMOS-Controlled Rapidly Tunable Photodetectors," Dissertation, Stanford University, Sep. 2006, 205 pages.

*Primary Examiner* — Daniel Petkovsek
(74) *Attorney, Agent, or Firm* — Amin, Turocy & Watson, LLP

(57) ABSTRACT

Techniques that facilitate control of dual phase tuners are provided. In one example, a system includes a first phase tuner and a second phase tuner. The first phase tuner is driven to a first phase bias that is different than a desired phase bias for an interferometer. The second phase tuner is driven to a second phase bias. A combination of the first phase bias and the second phase bias corresponds to the desired phase bias.

11 Claims, 10 Drawing Sheets

(56) References Cited

U.S. PATENT DOCUMENTS

| | | | |
|---|---|---|---|
| 2014/0355926 A1* | 12/2014 | Velthaus | G02F 1/0121 |
| | | | 385/3 |
| 2017/0285436 A1 | 10/2017 | Hochberg et al. | |
| 2018/0173023 A1 | 6/2018 | Streshinsky et al. | |
| 2018/0267340 A1* | 9/2018 | Rohde | H04L 27/2096 |
| 2019/0187495 A1* | 6/2019 | Melikyan | G02F 1/0353 |

* cited by examiner

CONTROL OF DUAL PHASE TUNERS

STATEMENT REGARDING FEDERALLY SPONSORED RESEARCH OR DEVELOPMENT

This invention was made with Government support under Contract No.: DE-AR0000844 awarded by Department of Energy. The Government has certain rights to this invention.

BACKGROUND

The subject disclosure relates to networking hardware and/or optical networking, and more specifically, to mixed signal design and/or communications systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate control of dual phase tuners are described.

According to an embodiment, a system can comprise a first phase tuner and a second phase tuner. The first phase tuner can be driven to a first phase bias that is different than a desired phase bias for an interferometer. The second phase tuner can be driven to a second phase bias. A combination of the first phase bias and the second phase bias can correspond to the desired phase bias.

According to another embodiment, a computer-implemented method is provided. The computer-implemented method can comprise setting, by a system operatively coupled to a processor, a first phase tuner to a first phase bias that is different than a desired phase bias for an interferometer. The computer-implemented method can also comprise setting, by the system, a second phase tuner to a second phase bias, wherein a combination of the first phase bias and the second phase bias corresponds to the desired phase bias.

According to yet another embodiment, a computer program product for facilitating control of dual phase tuners can comprise a computer readable storage medium having program instructions embodied therewith. The program instructions can be executable by a processor and cause the processor to set, by the processor, a first phase tuner to a first phase bias that is different than a desired phase bias for an interferometer. The program instructions can also cause the processor to set, by the processor, a second phase tuner to a second phase bias, wherein a combination of the first phase bias and the second phase bias corresponds to the desired phase bias.

DETAILED DESCRIPTION

Figure 1:
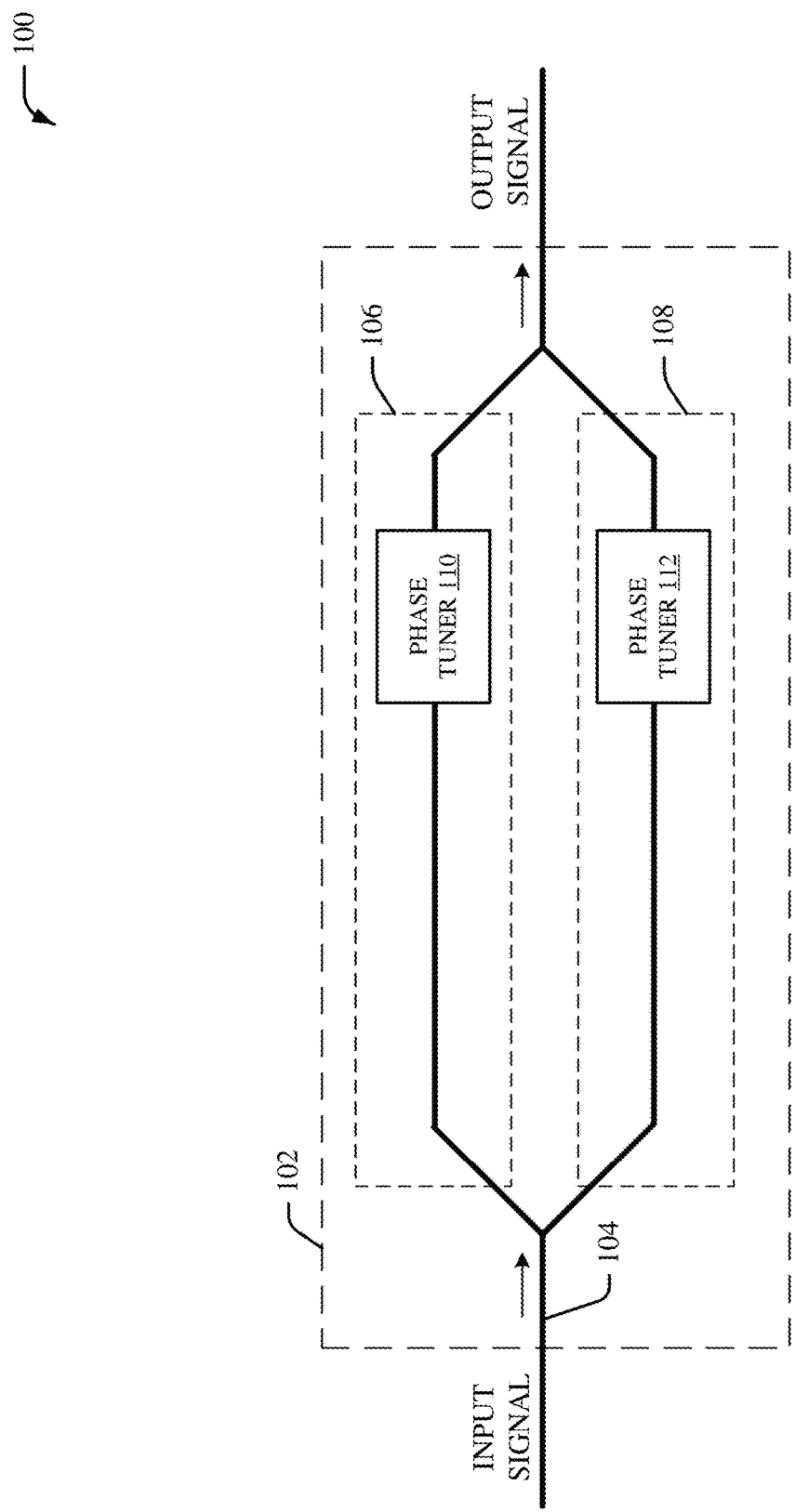
FIG. 1 illustrates an example, non-limiting system to facilitate control of dual phase tuners in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A phase shifter can be employed to alter the phase of an optical signal. However, a phase shifter (e.g., a thermo-optic phase shifter, a phase tuner or another type of phase shifter) that has a quadratic or other nonlinear relationship (e.g., a phase versus voltage relationship, a phase versus current relationship, etc.) can create a challenge in system design and/or system implementation. Furthermore, a digital-to-analog converter (DAC) employed to set a phase in phase shifter must provide a large enough resolution to meet requirements in a region of a curve (e.g., a phase-current curve) where an optical phase changes rapidly with voltage or current. However, this typically results in excessive resolution in the region of the curve where the optical phase changes more slowly with voltage or current. Furthermore, a nonlinear DAC that linearizes the relationship between optical phase and DAC level by implementing non-constant steps in current or voltage create an additional degree of complexity in system design and/or system implementation. As such, conventional phase shifters and/or conventional phase shifter systems waste power and/or create algorithmic complexity to control a phase shifter. Therefore, control of a phase shifter can be improved.

To address these and/or other problems associated with conventional phase shifters, conventional phase tuners, conventional digital-to-analog converters, and/or other conventional technologies, embodiments described herein include systems, computer-implemented methods, and computer program products for control of dual phase tuners. In an aspect, coarse and/or fine control of dual phase tuners with quadratic voltage and/or current dependencies can be provided. In another aspect, a dual phase tuner architecture can be employed to provide, for example, a factor of two reduction in power consumption over a conventional single-tuner architecture. Furthermore, the dual phase tuner architecture can be combined with a control scheme (e.g., a coarse/fine control scheme) to extract hidden resolution from a second phase tuner from the dual phase tuner architecture when a first phase tuner from the dual phase tuner architecture is employed for a region of a curve (e.g., a phase-current curve) where resolution is lacking. As such, digital-to-analog converter resolution associated with a phase tuner can be substantially reduced. In an embodiment, the first phase tuner can set phase beyond a targeted phase so that the phase is coarsely tuned. Furthermore, the second phase tuner can operate in a low current region and/or a low voltage region to counter the over-compensated phase provided by the first phase tuner. In certain embodiments, the first phase tuner can be located in a first arm of an interferometer and the second phase tuner can be located in a second arm of the interferometer. Because the second phase tuner is operating at a low current and/or a low voltage, the resolution can be increased, allowing fine tuning of a phase difference between the first arm of the interferometer and the second arm of the interferometer. Accordingly, performance of the interferometer can be improved. Furthermore, power consumption for the interferometer can be reduced. Moreover, accuracy of one or more settings for a digital-to-analog converter coupled to a phase tuner can be improved. Furthermore, one or more resolution requirements for a digital-to-analog converter coupled to a phase tuner can be reduced.

FIG. 1 illustrates an example, non-limiting system 100 that facilitates control of dual phase tuners in accordance with one or more embodiments described herein. In various embodiments, the system 100 can be a phase tuner system associated with technologies such as, but not limited to, networking hardware technologies, optical networking technologies, analog technologies, mixed signal design technologies, communication technologies, phase tuner technologies, phase shifter technologies, interferometer technologies, thermo-optic interferometric optical technologies, thermo-optic interferometric photonic technologies, digital-to-analog converter technologies, switch technologies, modulator technologies, wavelength filter technologies, power splitter technologies, power combiner technologies, sensor technologies, and/or other technologies. The system 100 can employ hardware and/or software to solve problems that are highly technical in nature, that are not abstract and that cannot be performed as a set of mental acts by a human. Further, in certain embodiments, some of the processes performed may be performed by one or more specialized computers (e.g., one or more specialized processing units, a specialized phase tuner, a specialized controller, etc.) for carrying out defined tasks related to control of one or more phase tuners. The system 100 and/or components of the system 100 can be employed to solve new problems that arise through advancements in technologies mentioned above, phase tuner architecture, computer architecture and/or the like. One or more embodiments of the system 100 can provide technical improvements to networking hardware systems, optical networking systems, analog systems, mixed signal design systems, communication systems, phase tuner systems, phase shifter systems, interferometer systems, thermo-optic interferometric optical systems, thermo-optic interferometric photonic systems, digital-to-analog converter systems, switch systems, modulator systems, wavelength filter systems, power splitter systems, power combiner systems, sensor systems, and/or other systems. One or more embodiments of the system 100 can also provide technical improvements to an interferometer by improving control of one or more phase tuners of an interferometer, improving performance of the interferometer and/or reducing power consumption for the interferometer.

In the embodiment shown in FIG. 1, the system 100 can include an interferometer 102. In an example, the interferometer 102 can be a Mach Zehnder interferometer. However, it is to be appreciated that the interferometer 102 can be a different type of interferometer such as a ring resonator enhanced Mach Zehnder interferometer, a Michelson interferometer, or another type of interferometer. The interferometer 102 can include a waveguide 104. The interferometer 102 can receive an input signal (e.g., INPUT SIGNAL shown in FIG. 1) and the input signal can travel through the interferometer 102 via the waveguide 104 and exit the interferometer 102 as an output signal (e.g., OUTPUT SIGNAL shown in FIG. 1). The input signal can be, for example, an optical signal. Furthermore, the output signal can be, for example, a modulated version of the input signal that is modulated by the interferometer 102. In certain embodiments, the input signal can be provided by a laser. Furthermore, in certain embodiments, the output signal can be provided to an optical detection component. In an aspect, the interferometer 102 can include an arm 106 and an arm 108. For example, the input signal can be split into two equal components where a first component of the input signal travel through the interferometer 102 via the arm 106 and a second component of the input signal travel through the interferometer 102 via the arm 108.

In an embodiment, the arm 106 of the interferometer 102 can include a phase tuner 110. Furthermore, the arm 108 of the interferometer 102 can include a phase tuner 112. In an example, the phase tuner 110 can be a first phase shifter and the phase tuner 112 can be a second phase shifter. In another example, the phase tuner 110 can be a first thermo-optic phase shifter and the phase tuner 112 can be a second thermo-optic phase shifter. However, it is to be appreciated that, in certain embodiments, the phase tuner 110 and/or the phase tuner 112 can be a different type of phase tuner. The phase tuner 110 can be driven to a first phase bias that is different than a desired phase bias for the interferometer 102. For example, the phase tuner 110 can be driven to a first phase bias that is higher than a desired phase bias for the interferometer 102. The desired phase bias for the interferometer 102 can be, for example, a desired Mach Zehnder bias point for the interferometer 102. Furthermore, the phase tuner 112 can be driven to a second phase bias. A combination of the first phase bias and the second phase bias can correspond to the desired phase bias. For instance, the second phase bias associated with the phase tuner 112 can be equal to the first phase bias minus the desired phase bias. As such, the phase tuner 110 can set phase beyond the desired phase for the interferometer 102 so that the phase is coarsely tuned. Furthermore, the phase tuner 112 can operate in a low current region and/or a low voltage region for the interferometer 102 to counter the over-compensated phase provided by the phase tuner 110. Moreover, hidden resolution from the phase tuner 112 can be extracted in response to the phase tuner 110 being employed for a region of a curve (e.g., a phase-current curve) for the interferometer 102 where resolution is lacking. In an embodiment, the phase tuner 112 can be driven to the second phase bias in response to a determination that a phase shift value associated with the phase tuner 110 is below a defined phase shift value. In another embodiment, the phase tuner 110 can be driven to a third phase bias equal to zero in response to a determination that a phase shift value associated with the phase tuner 110 is above a defined phase shift value. Additionally, the phase tuner 112 can be driven to a fourth phase bias in response to a determination that the phase tuner 110 is driven to the third phase bias. Furthermore, the phase tuner 110 can be driven to a fifth phase bias in response to a determination that the phase tuner 112 is driven to the fourth phase bias. For instance, in an example where the phase tuner 110 is set above pi (e.g., the defined bias) and the phase tuner 112 is set to the fourth phase bias, the phase tuner 110 can operate at a unique value that provides, in combination with the fourth bias, a desired phase bias (e.g., the phase tuner 110 will not be operated at the first phase bias). In certain embodiments, the phase tuner 110 can be coupled to a first digital-to-analog converter that comprises a first resolution associated with the first phase bias. Furthermore, the phase tuner 112 can be coupled to a second digital-to-analog converter that comprises a second resolution associated with the second phase bias. The second resolution associated with the second phase bias provided by the second digital-to-analog converter can be higher than the first resolution associated with the first phase bias provided by the first digital-to-analog converter. The first resolution and the second resolution can be a function of the voltage and/or the current provided by the first digital-to-analog converter and the second digital-to-analog converter, respectively. In certain embodiments, the first digital-to-analog converter and the second digital-to-analog converter can comprise a corresponding structure (e.g., a corresponding design). In certain embodiments, the first digital-to-analog converter can comprise a different structure (e.g., a different design) than the second digital-to-analog converter. In certain embodiments, the interferometer 102 can include one or more additional phase shifters (e.g., one or more additional electro-optic phase shifters and/or one or more additional thermo-optic phase shifters) employed for state change. For example, in certain embodiments, a phase shifter (e.g., an electro-optic phase shifter or a thermo-optic phase shifter) can be located before or after the phase tuner 110 along the waveguide 104 of the interferometer 102. Additionally or alternatively, a phase shifter (e.g., an electro-optic phase shifter or a thermo-optic phase shifter) can be located before or after the phase tuner 112 along the waveguide 104 of the interferometer 102.

Figure 2:
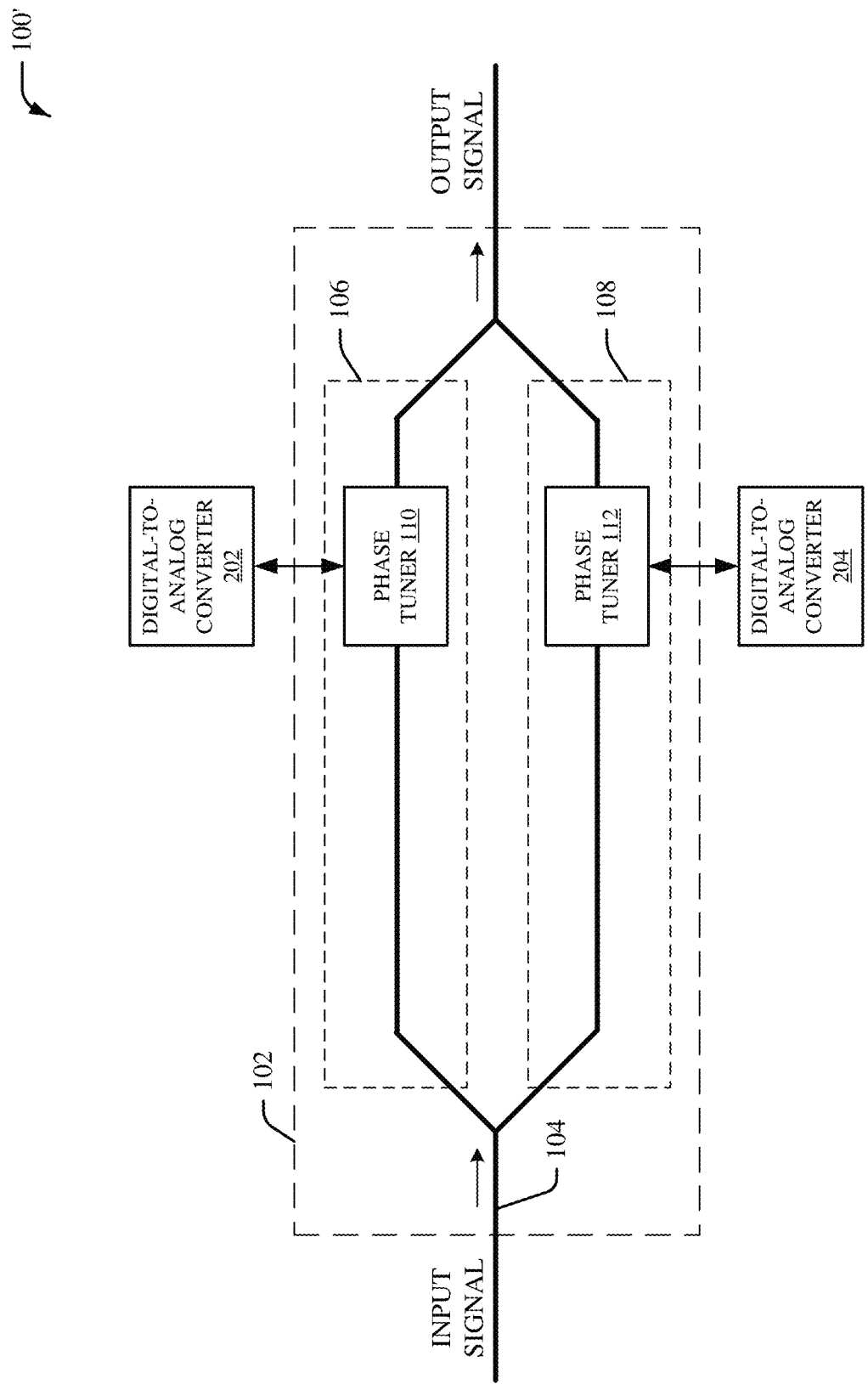
FIG. 2 illustrates another example, non-limiting system to facilitate control of dual phase tuners in accordance with one or more embodiments described herein.

FIG. 2 illustrates an example, non-limiting system 100' in accordance with one or more embodiments described herein. Repetitive description of like elements employed in other embodiments described herein is omitted for sake of brevity.

The system 100' can be an alternate embodiment of the system 100. The system 100' can include the interferometer 102. The interferometer 102 can include the waveguide 104, the arm 106 and the arm 108. Furthermore, the arm 106 of the interferometer 102 can include the phase tuner 110 and the arm 108 of the interferometer 102 can include the phase tuner 112. In an embodiment, the system 100' can include a digital-to-analog converter 202 and/or a digital-to-analog converter 204. In example, the digital-to-analog converter 202 and/or the digital-to-analog converter 204 can be implemented separate from the interferometer 102. In another example, the interferometer 102 can include the digital-to-analog converter 202 and/or the digital-to-analog converter 204. The digital-to-analog converter 202 can be coupled to the phase tuner 110. Furthermore, the digital-to-analog converter 204 can be coupled to the phase tuner 112. The digital-to-analog converter 202 can comprises a first resolution associated with the first phase bias. Furthermore, the digital-to-analog converter 204 can comprise a second resolution associated with the second phase bias. The second resolution associated with the digital-to-analog converter 204 can be higher than the first resolution associated with the digital-to-analog converter 202.

In an embodiment, the phase tuner 110 can be driven to a level for the digital-to-analog converter 202 that is above the desired phase bias for the interferometer 102. Furthermore, the phase tuner 112 can be driven to a level for the digital-to-analog converter 204 to compensate for an over step provided by the phase tuner 110. In an aspect, the level for the digital-to-analog converter 204 can be different than the level for the digital-to-analog converter 202. In certain embodiments, the digital-to-analog converter 202 and the digital-to-analog converter 204 can comprise a corresponding structure. For example, the digital-to-analog converter 202 and the digital-to-analog converter 204 can comprise a corresponding design. In certain embodiments, the digital-to-analog converter 202 can comprise a different structure (e.g., a different design) than the digital-to-analog converter 204. In an embodiment, the digital-to-analog converter 202 can be a first voltage digital-to-analog converter and the digital-to-analog converter 204 can be a second voltage digital-to-analog converter. As such, in an embodiment, the digital-to-analog converter 202 can provide a first analog voltage signal to the phase tuner 110 and the digital-to-analog converter 204 can provide a second analog voltage signal to the phase tuner 112. In another embodiment, the digital-to-analog converter 202 can be a first current digital-to-analog converter and the digital-to-analog converter 204 can be a second current digital-to-analog converter. As such, in an embodiment, the digital-to-analog converter 202 can provide a first analog current signal to the phase tuner 110 and the digital-to-analog converter 204 can provide a second analog current signal to the phase tuner 112.

Figure 3:
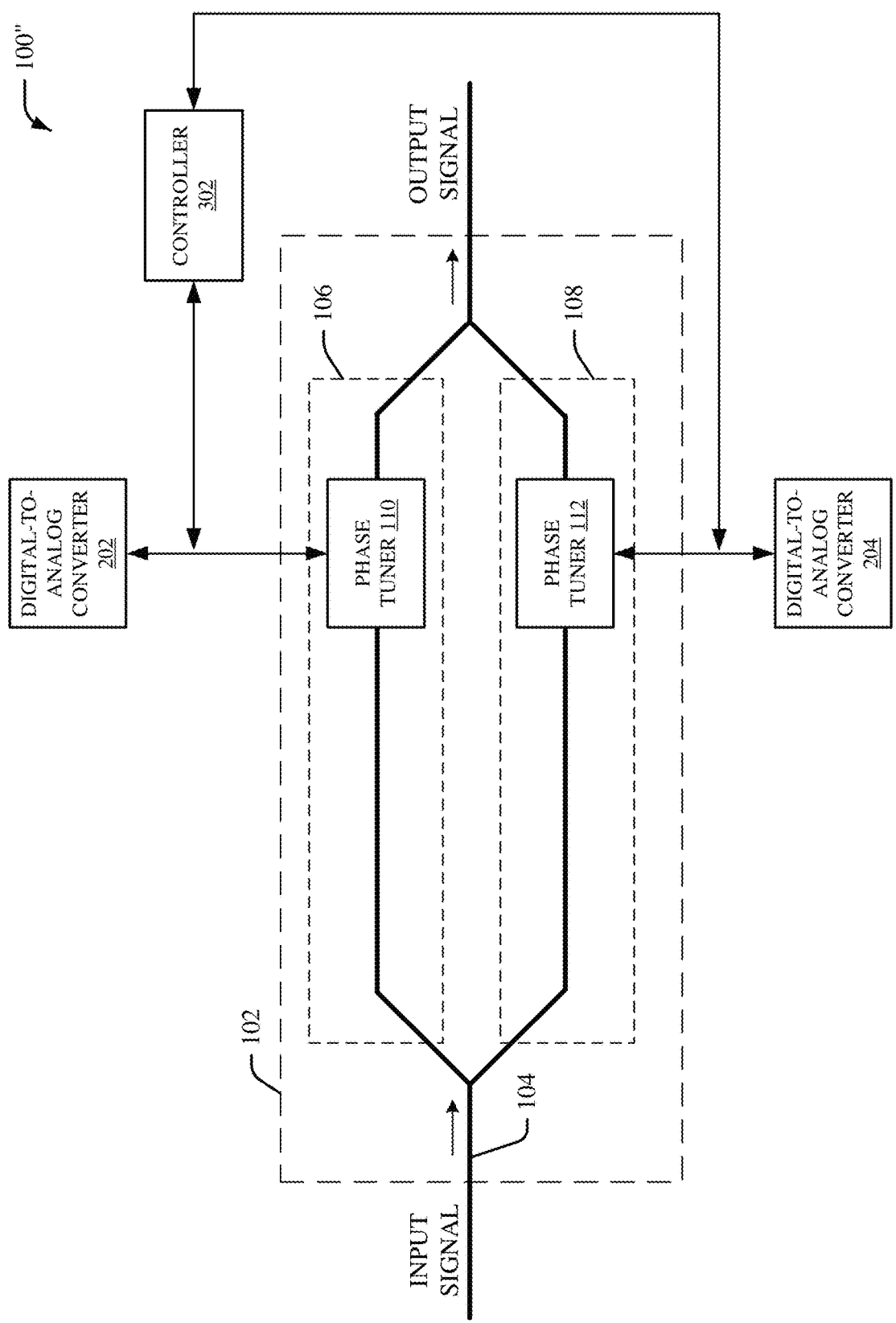
FIG. 3 illustrates yet another example, non-limiting system to facilitate control of dual phase tuners in accordance with one or more embodiments described herein.

FIG. 3 illustrates an example, non-limiting system 100" in accordance with one or more embodiments described herein. Repetitive description of like elements employed in other embodiments described herein is omitted for sake of brevity.

The system 100" can be an alternate embodiment of the system 100 and/or the system 100'. The system 100" can include the interferometer 102. The interferometer 102 can include the waveguide 104, the arm 106 and the arm 108. Furthermore, the arm 106 of the interferometer 102 can include the phase tuner 110 and the arm 108 of the interferometer 102 can include the phase tuner 112. In an embodiment, the system 100" can include the digital-to-analog converter 202 and/or the digital-to-analog converter 204. Furthermore, the system 100" can include a controller 302. The controller 302 can be communicatively coupled to the phase tuner 110, the digital-to-analog converter 202, the phase tuner 112 and/or the digital-to-analog converter 204. In an aspect the controller 302 can include and/or can be implemented as a hardware processor configured to execute a set of processing threads associated with control of the phase tuner 110, the digital-to-analog converter 202, the phase tuner 112 and/or the digital-to-analog converter 204. Additionally or alternatively, the controller 302 can include software to facilitate control of the phase tuner 110, the digital-to-analog converter 202, the phase tuner 112 and/or the digital-to-analog converter 204. In certain embodiments, the controller 302 can transmit one or more digital control signals to the digital-to-analog converter 202 and/or the digital-to-analog converter 204. In response to the one or more digital control signals, the digital-to-analog converter 202 can transmit an analog signal to the phase tuner 110 and/or the digital-to-analog converter 204 can transmit an analog signal to the phase tuner 112. For example, the digital-to-analog converter 202 can transmit an analog signal to the phase tuner 110 to set a phase bias for the phase tuner 110. Furthermore, the digital-to-analog converter 204 can transmit an analog signal to the phase tuner 112 to set a phase bias for the phase tuner 112. In certain embodiments, aspects of the controller 302 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the controller 302 can also include memory that stores computer executable components and instructions. Furthermore, the controller 302 can include and/or be implemented as a processor to facilitate execution of the instructions (e.g., computer executable components and corresponding instructions) by the controller 302. In an embodiment, the controller 302 can drive the phase tuner 112 to the second phase bias in response to a determination that a phase shift value associated with the phase tuner 110 is below a defined phase shift value. In another embodiment, the controller 302 can drive the phase tuner 110 to a third phase bias equal to zero in response to a determination that a phase shift value associated with the phase tuner 110 is above a defined phase shift value. Additionally, the controller 302 can drive the phase tuner 112 to a fourth phase bias in response to a determination that the phase tuner 110 is driven to the third phase bias. Furthermore, the controller 302 can drive the phase tuner 110 to a fifth phase bias in response to a determination that the phase tuner 112 is driven to the fourth phase bias.

Figure 4:
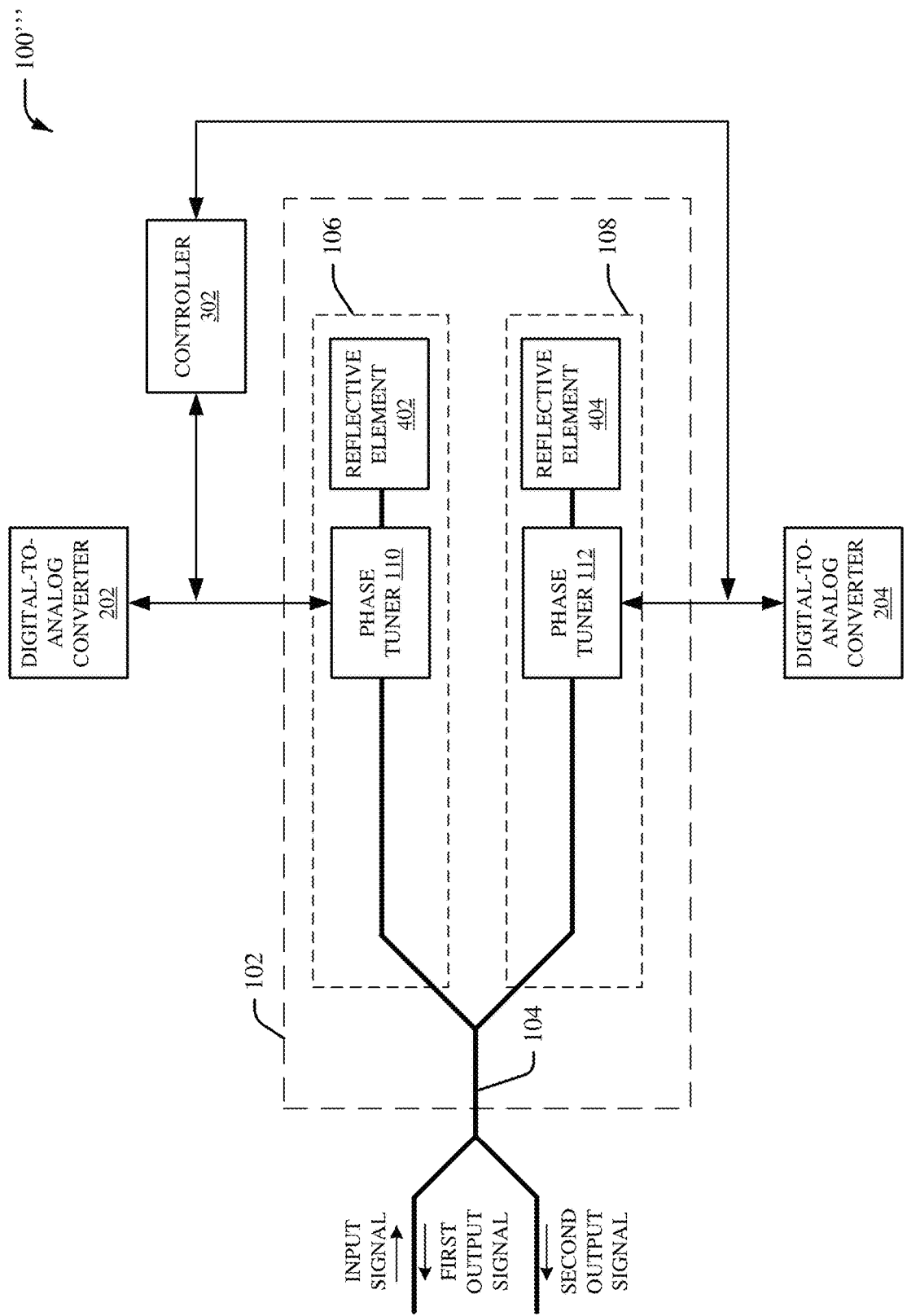
FIG. 4 illustrates yet another example, non-limiting system to facilitate control of dual phase tuners in accordance with one or more embodiments described herein.

FIG. 4 illustrates an example, non-limiting system 100'" in accordance with one or more embodiments described herein. Repetitive description of like elements employed in other embodiments described herein is omitted for sake of brevity.

The system 100'" can be an alternate embodiment of the system 100, the system 100' and/or the system 100". The system 100'" can include the interferometer 102. The interferometer 102 can include the waveguide 104, the arm 106 and the arm 108. Furthermore, the arm 106 of the interferometer 102 can include the phase tuner 110 and/or a reflective element 402. The arm 108 of the interferometer 102 can include the phase tuner 112 and/or a reflective element 404. In an embodiment, the system 100'" can include the digital-to-analog converter 202 and/or the digital-to-analog converter 204. Furthermore, the system 100'" can include a controller 302. The controller 302 can be communicatively coupled to the phase tuner 110, the digital-to-analog converter 202, the phase tuner 112 and/or the digital-to-analog converter 204. In one example, the interferometer 102 of the system 100'" can be a Michelson interferometer. For instance, the interferometer 102 can receive the input signal (and the input signal can travel through the interferometer 102 via the waveguide 104 and exit the interferometer 102 as a first output signal (e.g., FIRST OUTPUT SIGNAL shown in FIG. 4) and a second output signal (e.g., SECOND OUTPUT SIGNAL shown in FIG. 4). The first output signal can be, for example, a first modulated version of the input signal that is modulated by the interferometer 102. Furthermore, the second output signal can be, for example, a second modulated version of the input signal that is modulated by the interferometer 102. The reflective element 402 can reflect a signal provided by the phase tuner 110 to provide the first output signal. The reflective element 404 can reflect a signal provided by the phase tuner 112 to provide the second output signal. The reflective element 402 can be, for example, a mirror, a Bragg mirror, a reflective surface, a Sagnac loop mirror, or another reflective element. Furthermore, the reflective element 404 can be, for example, a mirror, a Bragg mirror, a reflective surface, a Sagnac loop mirror, or another reflective element. In an aspect, the first output signal and the second output signal can emerge from the interferometer 102 at the an coupler of the interferometer 102 that receives the input signal.

Figure 5:
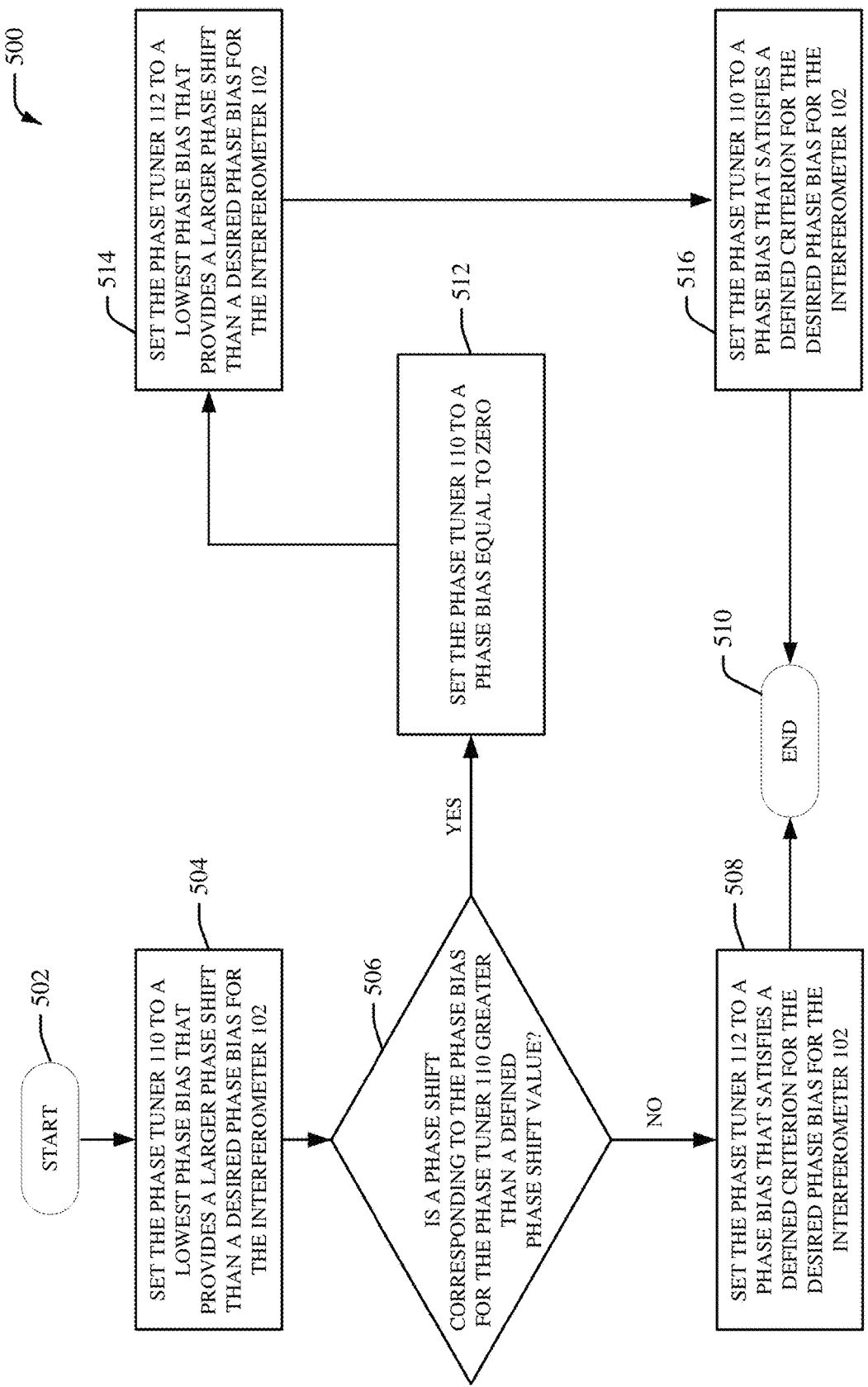
FIG. 5 illustrates an example, non-limiting system associated with a process to control dual phase tuners in accordance with one or more embodiments described herein.

FIG. 5 illustrates an example, non-limiting system 500 in accordance with one or more embodiments described herein. Repetitive description of like elements employed in other embodiments described herein is omitted for sake of brevity.

The system 500 can be a process (e.g., an algorithm) employed, for example, by the controller 302, to control the phase tuner 110 and/or the phase tuner 112. In certain embodiments, the system 500 can correspond to logic for a finite state machine associated with the controller 302. The system 500 can include a process step 502, a process step 504, a process step 506, a process step 508, a process step 510, a process step 512, a process step 514, and/or a process step 516. At the process step 502, control of the phase tuner 110 and/or the phase tuner 112 can start. At the process step 504, the phase tuner 110 can be set (e.g., by the controller 302) to a lowest phase bias that provides a larger phase shift than a desired phase bias for the interferometer 102. For example, the phase tuner 110 can be set (e.g., by the controller 302) to a lowest current level and/or a lowest voltage level that that provides a larger phase shift than a desired phase bias for the interferometer 102. At the process step 506, it can be determined (e.g., by the controller 302) whether a phase shift corresponding to the phase bias for the phase tuner 110 is greater than a defined phase shift value. For example, it can be determined (e.g., by the controller 302) whether a phase shift corresponding to the phase bias for the phase tuner 110 is greater than a defined phase shift value equal to pi (e.g., 180 degrees). In response to a determination (e.g., by the controller 302) that the phase shift corresponding to the phase bias for the phase tuner 110 is less than or equal to the defined phase shift value, at the process step 508, the phase tuner 112 can be set (e.g., by the controller 302) to a phase bias that satisfies a defined criterion for the desired phase bias for the interferometer 102. For example, in response to a determination (e.g., by the controller 302) that the phase shift corresponding to the phase bias for the phase tuner 110 is less than or equal to the defined phase shift value, the phase tuner 112 can be set (e.g., by the controller 302) to a phase bias that optimally satisfies the desired phase bias for the interferometer 102. After the process step 508, the process step 510 can be performed to end control of the phase tuner 110 and/or the phase tuner 112.

Additionally, in response to a determination (e.g., by the controller 302) that the phase shift corresponding to the phase bias for the phase tuner 110 is greater than the defined phase shift value, at the process step 512, the phase tuner 110 can be set (e.g., by the controller 302) to a phase bias equal to zero. In response to a determination (e.g., by the controller 302) that the phase bias for the phase tuner 110 is set to zero, at the process step 514, the phase tuner 112 can be set (e.g., by the controller 302) to a lowest phase bias that provides a larger phase shift than a desired phase bias for the interferometer 102. For example, the phase tuner 112 can be set (e.g., by the controller 302) to a lowest current level and/or a lowest voltage level that that provides a larger phase shift than a desired phase bias for the interferometer 102. In response to a determination (e.g., by the controller 302) that the phase tuner 112 is set to the lowest phase bias that provides the larger phase shift that the desired phase bias for the interferometer 102, at the process step 516, the phase tuner 110 can be set (e.g., by the controller 302) to a phase bias that satisfies a defined criterion for the desired phase bias for the interferometer 102. For example, in response to a determination (e.g., by the controller 302) that the phase tuner 112 is set to the lowest phase bias that provides the larger phase shift that the desired phase bias for the interferometer 102, the phase tuner 110 can be set (e.g., by the controller 302) to a phase bias that optimally satisfies the desired phase bias for the interferometer 102. After the process step 516, the process step 510 can be performed to end control of the phase tuner 110 and/or the phase tuner 112. As such, coarse control and/or fine control of the phase tuner 110 and/or the phase tuner 112 can be provided.

Figure 6:
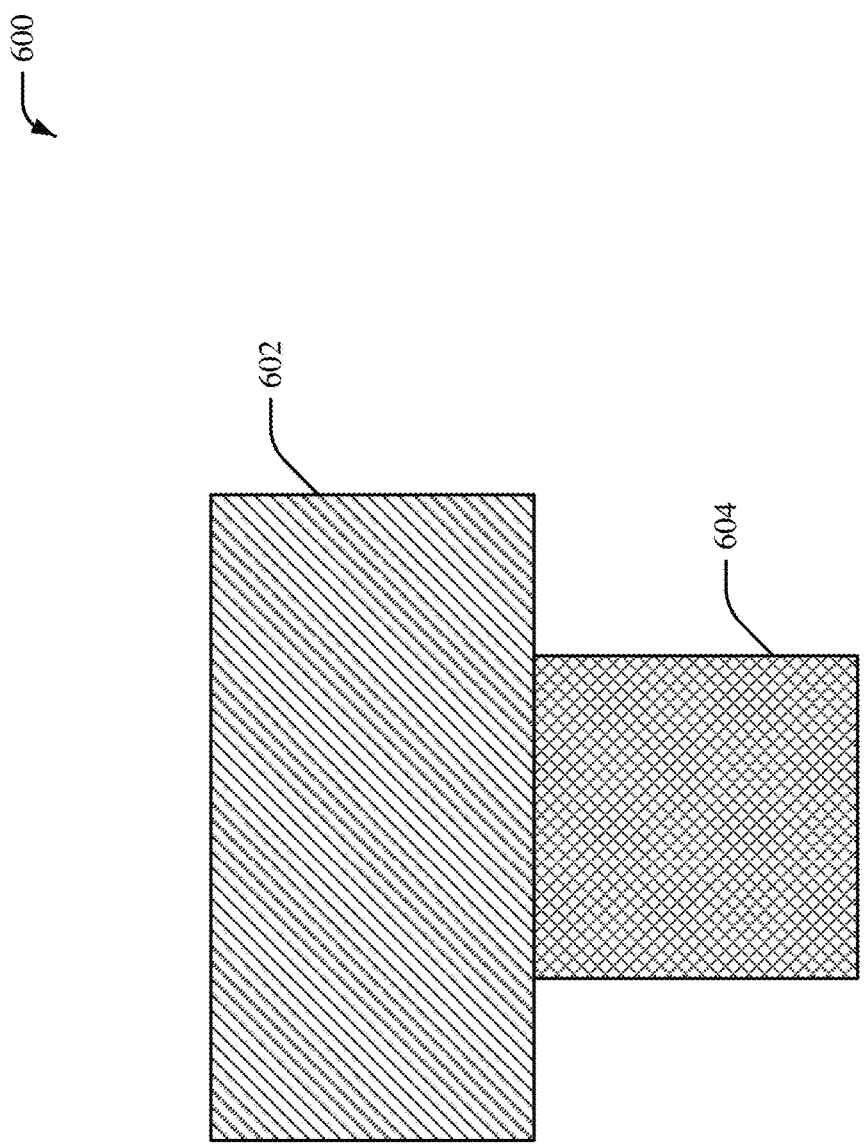
FIG. 6 illustrates an example, non-limiting system associated with a phase shifter implementation in accordance with one or more embodiments described herein.

FIG. 6 illustrates an example, non-limiting system 600 in accordance with one or more embodiments described herein. Repetitive description of like elements employed in other embodiments described herein is omitted for sake of brevity.

The system 600 can be a back end of line (BEOL) system for a resistor-based phase shifter implementation in silicon-based manufacturing. For example, the system 600 can be a BEOL system for a resistor-based thermo-optic phase shifter implementation in silicon-based manufacturing. In an embodiment, a back-end resistor layer 602 can be routed over a waveguide layer 604. For example, the waveguide layer 604 can correspond to at least a portion of the waveguide 104 of the interferometer 102. The waveguide layer 604 can be, for example, a silicon waveguide layer. For example, the waveguide layer 604 can be a fully etched silicon waveguide layer. In certain embodiments, a gap can be located between the back-end resistor layer 602 and the waveguide layer 604. For example, in certain embodiments, a gap filled with silicon dioxide can be located between the back-end resistor layer 602 and the waveguide layer 604.

Figure 7:
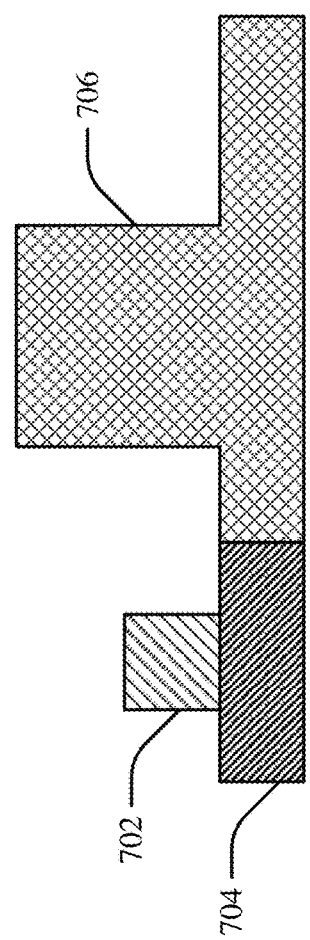
FIG. 7 illustrates another example, non-limiting system associated with a phase shifter implementation in accordance with one or more embodiments described herein.

FIG. 7 illustrates an example, non-limiting system 700 in accordance with one or more embodiments described herein. Repetitive description of like elements employed in other embodiments described herein is omitted for sake of brevity.

The system 700 can be a front end of line (FEOL) system for a resistor-based phase shifter implementation in silicon-based manufacturing. For example, the system 700 can be a FEOL system for a resistor-based thermo-optic phase shifter implementation in silicon-based manufacturing. In an embodiment, a front-end resistor layer 702 can be formed on a doped layer 704. The doped layer 704 can be, for example, an n+ doped layer. A waveguide layer 706 can be attached to the doped layer 704. For example, the waveguide layer 706 can correspond to at least a portion of the waveguide 104 of the interferometer 102. The waveguide layer 706 can be, for example, a silicon waveguide layer. For example, the waveguide layer 706 can be a partially etched silicon waveguide layer. In another example, the waveguide layer 706 can be a poly-silicon waveguide layer.

Figure 8:
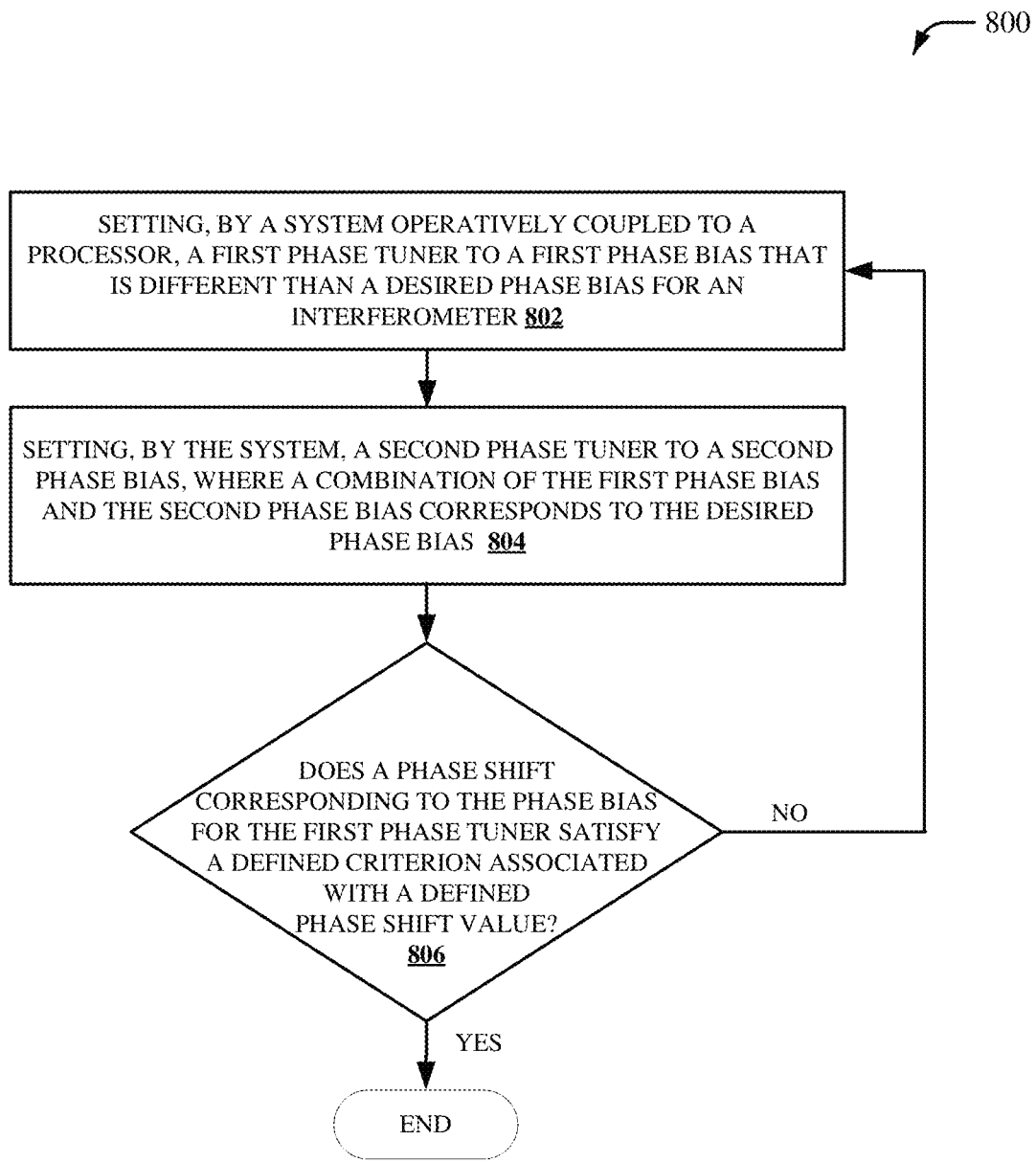
FIG. 8 illustrates a flow diagram of an example, non-limiting computer-implemented method for facilitating control of dual phase tuners in accordance with one or more embodiments described herein.

FIG. 8 illustrates a flow diagram of an example, non-limiting computer-implemented method 800 for facilitating control of dual phase tuners in accordance with one or more embodiments described herein. At 802, a first phase tuner is set, by a system operatively coupled to a processor (e.g., by controller 302), to a first phase bias that is different than a desired phase bias for an interferometer. For example, the first phase tuner can be driven to a first phase bias that is higher than a desired phase bias for the interferometer. In one example, the interferometer can be a Mach Zehnder interferometer. In another example, the interferometer can be a ring resonator enhanced Mach Zehnder interferometer. In yet another example, the interferometer can be a Michelson interferometer. In an embodiment, the first phase tuner can be located in a first arm of the interferometer. In one example, the first phase tuner can be a first phase shifter. In another example, the first phase tuner can be a first thermo-optic phase shifter. In another embodiment, the first phase tuner can be coupled to a first digital-to-analog converter that comprises a first resolution associated with the first phase bias.

At 804, a second phase tuner is set, by the system (e.g., by controller 302), to a second phase bias, where a combination of the first phase bias and the second phase bias corresponds to the desired phase bias. In an embodiment, the second phase tuner can be located in a second arm of the interferometer. In one example, the second phase tuner can be a second phase shifter. In another example, the second phase tuner can be a second thermo-optic phase shifter. In another embodiment, the second phase tuner can be coupled to a second digital-to-analog converter that comprises a second resolution associated with the second phase bias. Furthermore, the second resolution associated with the second phase shifter can be higher than the first resolution associated with the first phase shifter.

At 806, it is determined whether a phase shift corresponding to the phase bias for the first phase tuner satisfies a defined criterion associated with a defined phase shift value. For example, it can be determined whether a phase resolution for the interferometer is adequate. If no, the computer-implemented method 800 returns to 802. If yes, the computer-implemented method 800 ends.

In certain embodiments, the setting the second phase tuner to the second phase bias can comprise setting the second phase tuner to the second phase bias in response to a determination that a phase shift value associated with the first phase tuner is below a defined phase shift value. In certain embodiments, the computer-implemented method 800 can additionally or alternatively include setting, by the system (e.g., by controller 302), the first phase tuner to a third phase bias equal to zero in response to a determination that a phase shift value associated with the first phase tuner is above a defined phase shift value. In certain embodiments, the computer-implemented method 800 can additionally or alternatively include setting, by the system (e.g., by controller 302), the second phase tuner to a fourth phase bias in response to a determination that the first phase tuner is driven to the third phase bias. In certain embodiments, the computer-implemented method 800 can additionally or alternatively include setting, by the system (e.g., by controller 302), the first phase tuner to a fifth phase bias in response to a determination that the second phase tuner is driven to the fourth phase bias. In certain embodiments, the setting the second phase tuner to the second phase bias can comprise reducing power consumption for the interferometer.

For simplicity of explanation, the computer-implemented method 800 is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented method 800 in accordance with the disclosed subject matter. In addition, those skilled in the art will understand and appreciate that the computer-implemented method 800 can alternatively be represented as a series of interrelated states via a state diagram or events. Additionally, it should be further appreciated that the computer-implemented method 800, other methodologies and/or other processes disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least setting a phase tuner to a phase bias is established from a combination of electrical and mechanical components and circuitry, a human is unable to replicate or perform processing performed by a controller (e.g., the controller 302) disclosed herein. Furthermore, a human is unable to set a phase tuner to a particular phase bias.

Figure 9:
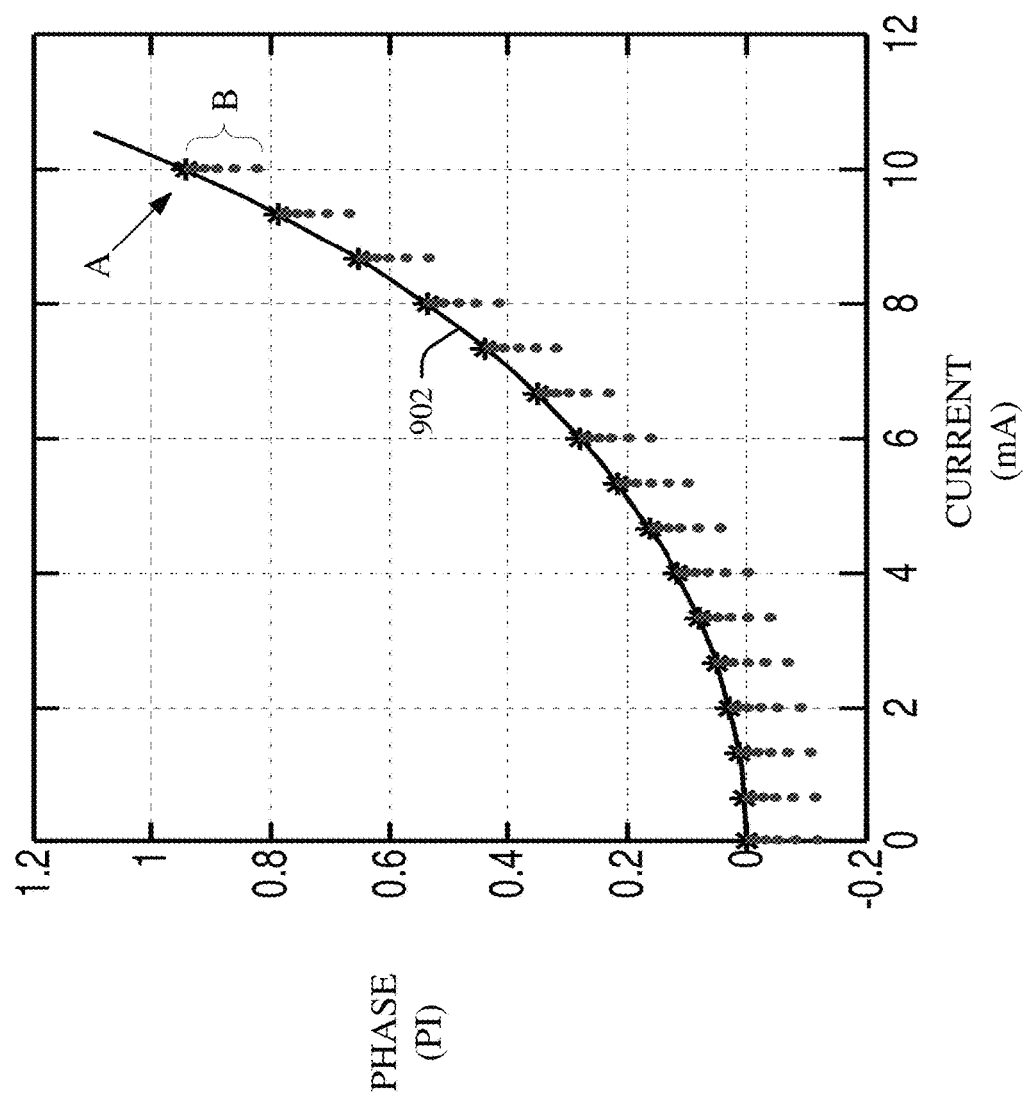
FIG. 9 illustrates an example, non-limiting graph associated with achieved resolution by employing control of dual phase tuners in accordance with one or more embodiments described herein.

FIG. 9 illustrates an example, non-limiting graph 900 in accordance with one or more embodiments described herein. Repetitive description of like elements employed in other embodiments described herein is omitted for sake of brevity.

The graph 900 can illustrate achieved resolution by employing the system 100, the system 100', the system 100", the system 100''', the system 500, the system 600, the system 700 and/or the computer-implemented method 800 disclosed herein. The graph 900 can include an x-axis that represents current measured in milliamps (mA) and a y-axis that represents delta phase measured in pi. By employing a conventional single tuner architecture, a resolution A can be achieved. In contrast, by employing a dual phase tuner architecture disclosed herein, a resolution B associated with coarse tuning and/or fine tuning can be achieved. The resolution B can also be associated with hidden resolution provided by a second phase tuner when a first phase tuner is employed for a region of a curve 902 where resolution is lacking.

Figure 10:
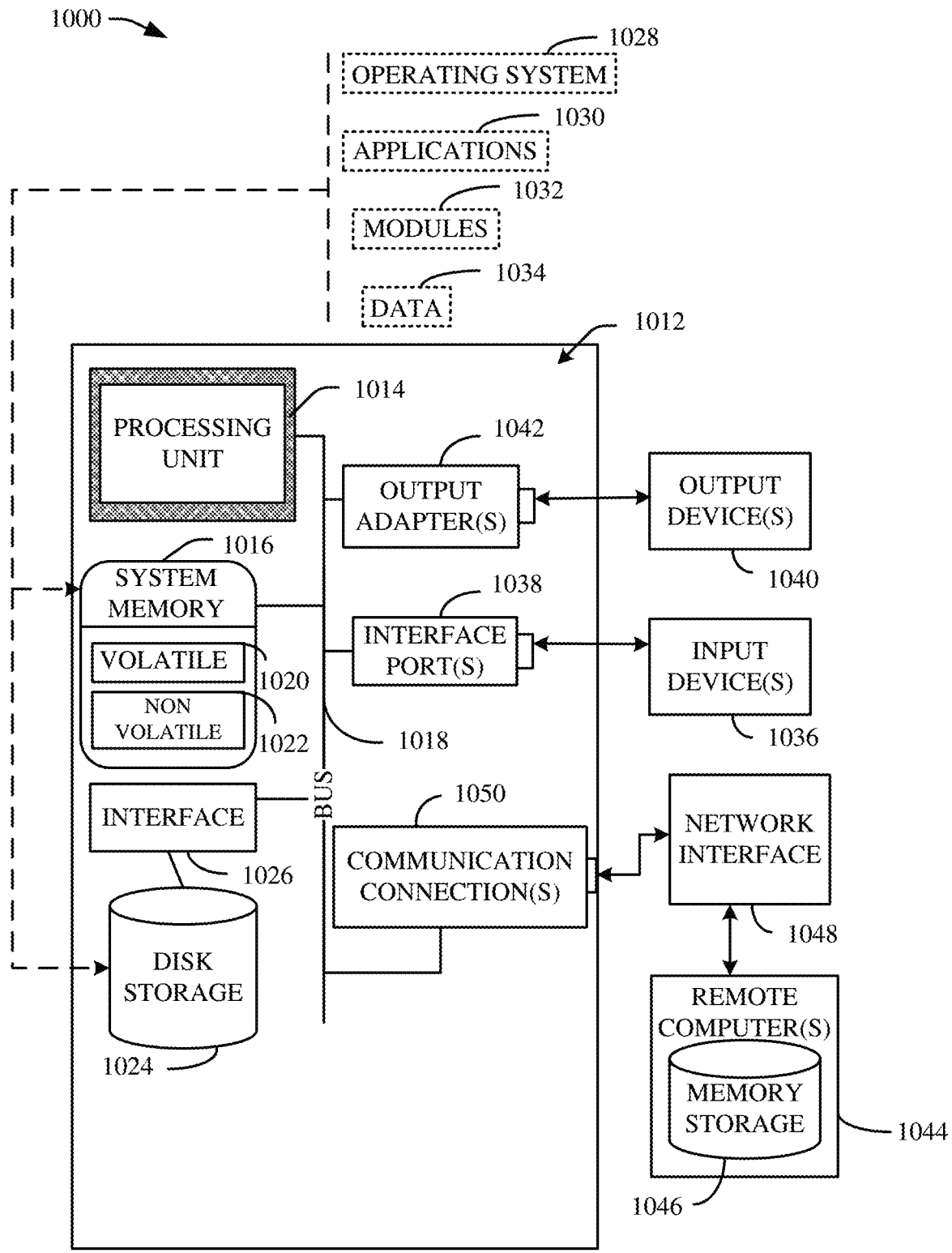
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a first phase tuner that is driven to a first phase bias that is different than a defined phase bias for an interferometer; and
    a second phase tuner that is driven to a second phase bias, wherein a combination of the first phase bias and the second phase bias corresponds to the defined phase bias, wherein the first phase tuner is driven to a third phase bias equal to zero in response to a determination that a phase shift value associated with the first phase tuner is above 180 degrees, and wherein the first phase tuner is driven to the third phase bias after the first phase tuner is driven to the first phase bias.

2. The system of claim 1, wherein the first phase tuner is coupled to a first digital-to-analog converter that comprises a first resolution associated with the first phase bias.

3. The system of claim 2, wherein the second phase tuner is coupled to a second digital-to-analog converter that comprises a second resolution associated with the second phase bias, and wherein the second resolution is higher than the first resolution.

4. The system of claim 3, wherein the first digital-to-analog converter and the second digital-to-analog converter comprise a corresponding structure.

5. The system of claim 1, wherein the first phase tuner is located in a first arm of the interferometer and the second phase tuner is located in a second arm of the interferometer.

6. The system of claim 1, wherein the second phase tuner is driven to the second phase bias in response to a determination that a phase shift value associated with the first phase tuner is below 180 degrees.

7. The system of claim 1, wherein the second phase tuner is driven to a fourth phase bias in response to a determination that the first phase tuner is driven to the third phase bias.

8. The system of claim 7, wherein the first phase tuner is driven to a fifth phase bias in response to a determination that the second phase tuner is driven to the fourth phase bias.

9. The system of claim 1, wherein the first phase tuner is a first thermo-optic phase shifter, and wherein the second phase tuner is a second thermo-optic phase shifter.

10. The system of claim 1, wherein the interferometer is a Mach Zehnder interferometer, a ring resonator enhanced Mach Zehnder interferometer, or a Michelson interferometer.

11. The system of claim 1, wherein the first phase tuner and the second phase tuner facilitate reduced power consumption for the interferometer.

* * * * *